United States Patent [19]

Donath

[11] 4,408,350

[45] Oct. 4, 1983

[54] ENHANCED SELECTIVITY SIGNAL RECEIVER

[76] Inventor: Erwin Donath, 40, Balcourt Dr., Princeton, N.J. 08540

[21] Appl. No.: 445,725

[22] Filed: Nov. 30, 1982

Related U.S. Application Data

[63] Continuation-in-part of Ser. No. 350,335, Feb. 12, 1982.

[51] Int. Cl.³ .............................................. H04B 1/12
[52] U.S. Cl. .................................... 455/206; 455/284; 455/306; 455/311
[58] Field of Search ................. 455/63, 206, 266, 295, 455/296, 303–306, 311, 284, 276; 375/99, 102; 358/167; 179/1 P; 328/165

[56] References Cited

U.S. PATENT DOCUMENTS 3,753,123  8/1973  Carpenter et al. .................. 455/305
4,308,621 12/1981  Mendelson .......................... 455/284

Primary Examiner—Robert L. Griffin
Assistant Examiner—Albert W. Watkins
Attorney, Agent, or Firm—Erwin S. Teltscher

[57] ABSTRACT

In a reception system which includes a receiver having a plurality of inter-connected stages and a demodulator, and where there appears at an input of the receiver a desired signal which occupies substantially a predetermined bandwidth, and at least one undesired signal which occupies a bandwidth different from, though partially overlapping the predetermined bandwidth, the improvement includes a signal selector coupled to receiver terminals upstream of the receiver demodulator for normally continuously selecting one of the signals appearing across the receiver terminals, a gain-controlled feedback stage connected with one input thereof to an output of the signal selector for negatively feeding back to the receiver terminals one of the signals substantially 180° out of phase with the spectrum characteristic of the undesired signal when the one of the signals is the undesired signal, a frequency-dependent selection device connected to the receiver terminals for selecting the undesired signal, so as to substantially isolate it from any other signals, and a comparator for comparing the output thereat of the undesired signal at least with a reference level, and for generating at least one error control signal, which feeds another input of the gain-controlled feedback device. The reference level is set so as to force any remnants of the undesired signal which still appears at the input of the demodulator of the receiver to assume, through the error control signal, a level below a level of the desired signal thereat, which differs from the level of the desired signal by at least such a level difference between the desired and undesired signals, which permits the demodulator to demodulate the desired signal at an acceptable signal-to-noise ratio, so that demodulation of the undesired signal is prevented.

20 Claims, 9 Drawing Figures

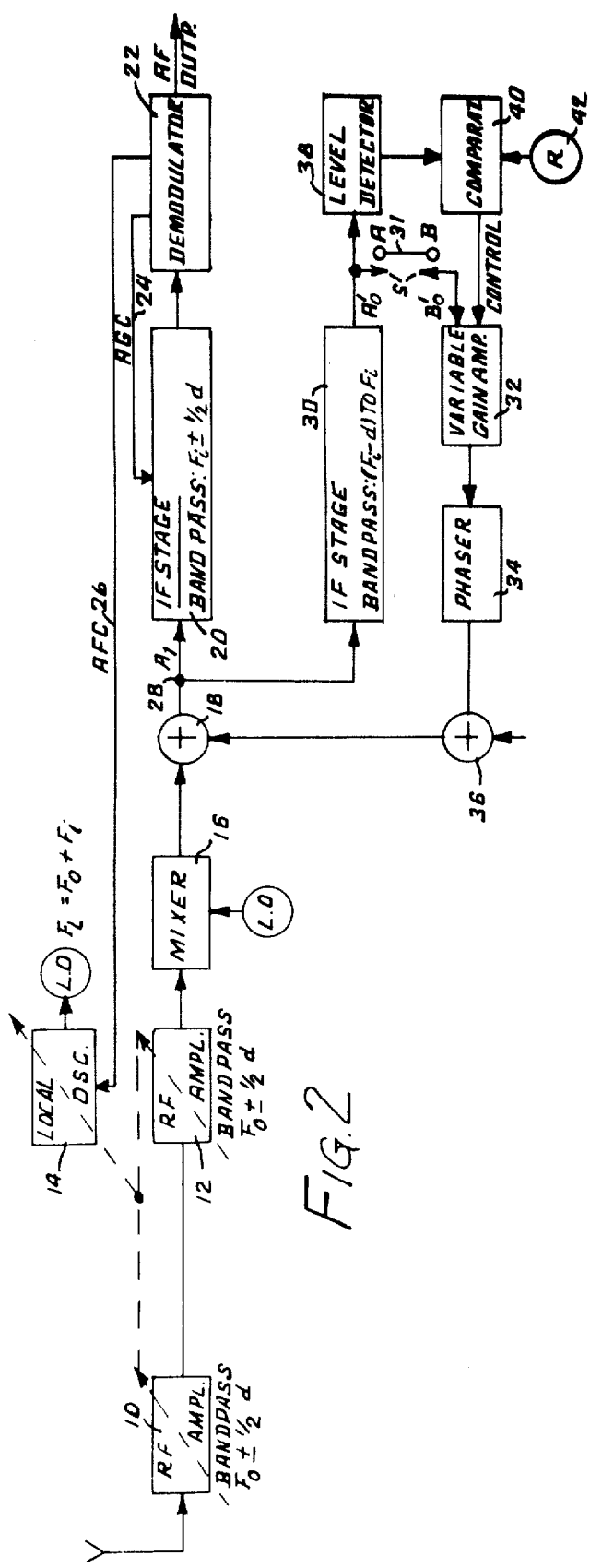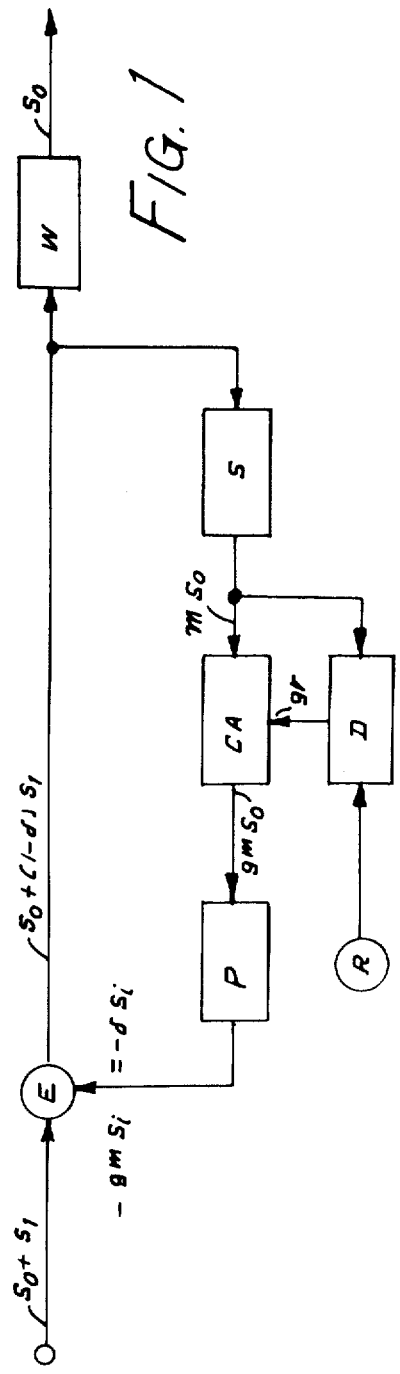

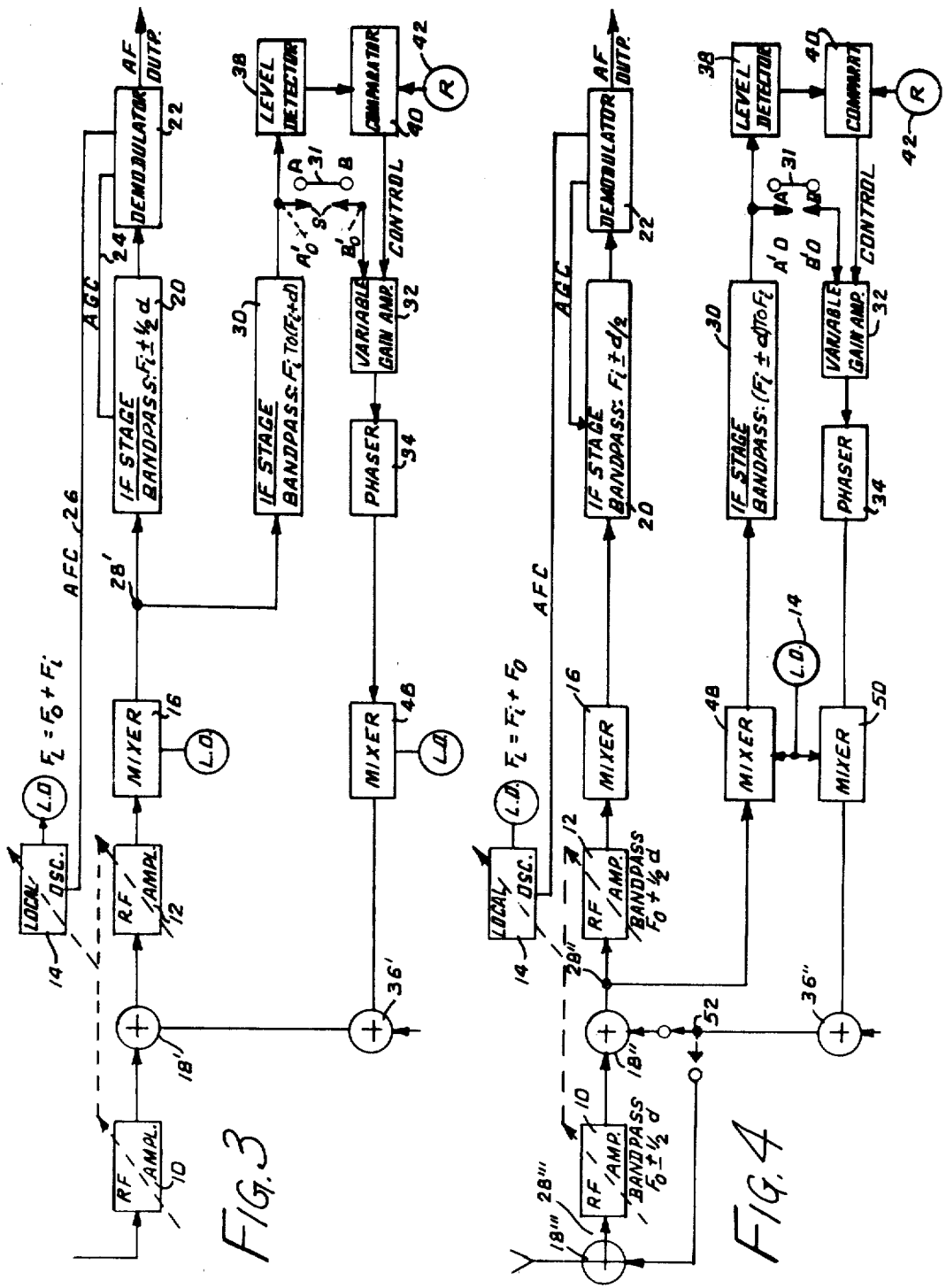

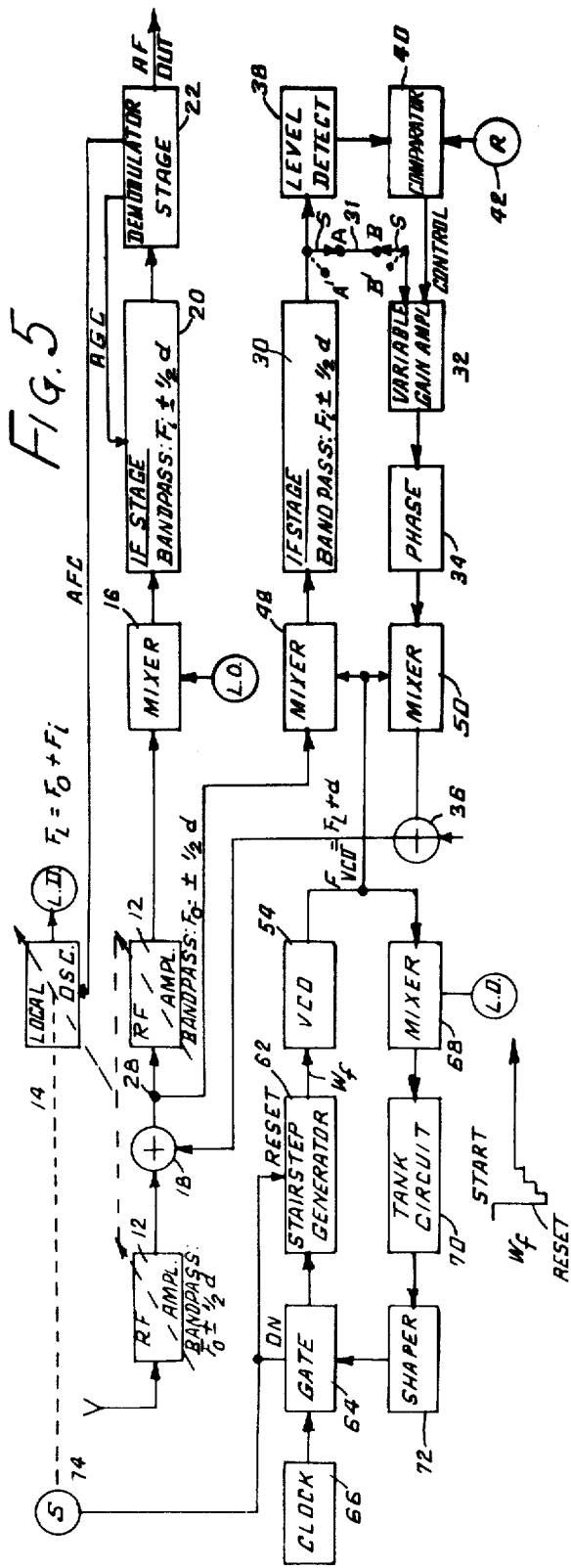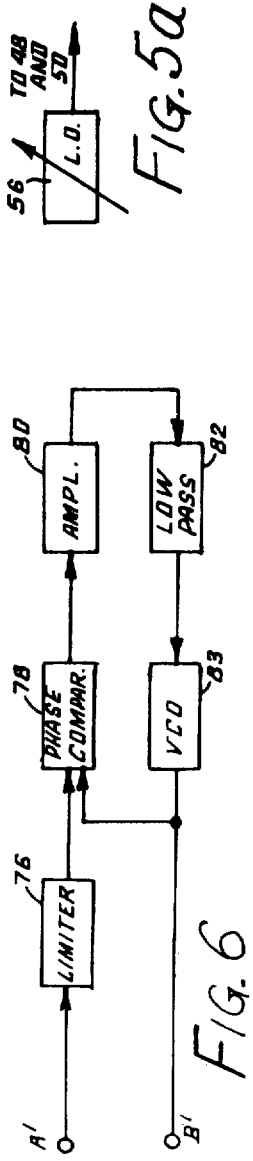

ENHANCED SELECTIVITY SIGNAL RECEIVER

REFERENCE TO OTHER APPLICATIONS

This application is a continuation-in-part application of application Ser. No. 350,335 filed on Feb. 12, 1982.

BACKGROUND OF THE INVENTION

One of the advantages of frequency-modulated (FM) transmission systems is the "capture" effect, the ability of an FM discriminator, such as a phase-locked loop or a ratio-detector, to demodulate "coherently", to "lock-on" the spectrum of a stronger signal spectrum and to completely ignore a weaker signal having a spectrum partially overlapping that of the stronger one. However, this advantage turns into a decisive disadvantage whenever the weaker signal is the desired one. Combatting interference due to such spectrum overlap currently requires inefficient use of available spectrum space by providing "guard bands" beyond the bandwidth required for information transmission and by geographic dispersion and reduced power of adjacent frequency transmission channels. Notwithstanding such costly precautions, the interference by stronger signals continues to be a problem in fringe areas or in mobile receivers.

A number of solutions have been proposed to mitigate or eliminate the capture effect. Thus Wilmotte, in U.S. Pat. No. 2,386,528 proposes cancellation of the stronger signal by selectively detecting two different signals, and relying on amplitude discrimination. The combination of the weak and strong signals, on emerging from a superheterodyning circuit of a receiver, is amplified in an intermediate frequency amplifier and clipped in a limiter; the amplified and clipped signal is combined with the signal emerging from the superheterodyning circuit in a combining circuit buffered or isolated from the receiver without making use of frequency discrimination, and is further amplified in a chain separate from the receiver. Wilmotte, in U.S. Pat. No. 2,388,200 purposes a solution applicable primarily to a strong frequency modulated signal in the presence of a weaker amplitude-modulated signal, where the detected output of the frequency modulated signal, due to the employment of a limiter and regenerative feedback, is increased with respect to that of the amplitude-modulated signal.

Harmon, in U.S. Pat. No. 2,609,535 discloses a system of transmitting two frequency-modulated signals over a common channel, and detecting the signals separately without mutual interference; as the signal waveforms of the transmitted signal must observe special relationships, Harmon's system is not, though, applicable to the capture effect.

Perkins, in U.S. Pat. No. 3,020,403 proposes a solution to the capture effect by converting the received frequency-modulated signals to amplitude-modulated signals, and processing the resultant signals to favor the weaker of the two signals.

Moore, in U.S. Pat. No. 3,091,735 proposes signal processing of two overlapping signals after a limiter postcoupled to a common intermediate frequency stage and uses a further limiter in a channel postcoupled to the first limiter, in addition to a variable gain amplifier, to select the weaker over the stronger signals.

Castellini, in U.S. Pat. No. 3,092,776, discloses a method and an apparatus for the reduction of interference by relying on the fact that given two waves, one of which is weaker relative to the other, the weaker wave may be obtained in association with a third wave, relative to which it is the stronger.

Ludwig, in U.S. Pat. No. 3,205,443, discloses an interfering signal resolving system relying on a tracking attenuator.

Baghdady, in U.S. Pat. No. 3,287,645, discloses circuitry for dividing the intermediate frequency signal into two channels. The first channel contains a beat frequency detector, the output of which is connected to one input of a balanced modulator, the other input of which is the intermediate frequency signal. The second channel includes a square law device which feeds one input of a second balanced modulator, the second input of which is the intermediate frequency signal. The output of the second balanced modulator is then passed through a bandpass filter. The output of the filter and the output of the first balanced modulator are then applied to an adder circuit, the output of which contains the desired signal at a sufficient amplitude relative to the undesired one to enable it to be captured by the succeeding FM limiter and detector.

Baghdady, in U.S. Pat. No. 3,911,366 discloses a receiver interference suppression technique and apparatus, relying on a first limiter in a first channel, a second limiter in the first channel, a limiter in a second channel, on a linear transfer device in the second channel, and on an output combiner of the two channels to suppress disturbances caused by certain troublesome forms of interference.

Ogita, in U.S. Pat. No. 4,249,261, discloses a superheterodyne radio receiver with nearby-station interference detection, in which a cancelling signal, generated by a phase-locked loop following, or attempting to follow, the strongest R.F. signal, is fed to the radio frequency stage of the receiver. Ogita employs detection means which are not frequency-dependent but deliver a detection signal representing an indication of the occurrance, in the receiver, of an interference by an adjacent-channel signal, whenever there is detected the condition that the RF signal level exceeds a predetermined reference level, and that, at the same time, the IF signal is lower than another predetermined reference level. The transition from one set of conditions to another is not continuous, but the phase-locked loop is switched in and out of the receiver circuitry by a switch according to the abovedescribed criteria. Discontinuous use of a phase-locked loop does, of course, usually present problems of acquisition, there being a finite acquisition time, which results either in undesirable switching transients, or other undesirable interference with reception of the desired signal.

The presence of the detection signal is a condition precedent to the operation of the phase-locked loop; in other words the phase-locked loop cannot properly operate in Ogita's receiver without the generation of the detection signal, which in turn controls the On-Off operation of the phase-locked loop.

Carpenter, in U.S. Pat. No. 3,753,123 discloses a technique and apparatus for cancelling FM modulated radio waves. Like Ogita, he generates a cancelling signal from a phase-lock loop following or attempting to follow the interfering FM signal. His invention does not solve the problem of distinguishing between two signals using the same modulation method for the purpose of cancelling only the interfering one. It appears to be intended for a different application, presumably to solve problems such as may occur in space vehicles where interference from radio waves carrying different types of modulated must be sorted out.

SUMMARY OF THE INVENTION

It is accordingly a principal object of the present invention to obviate the disadvantages of the prior art and to devise a receiver which effectively combats the capture of the demodulator by an undesired signal without losing the advantages of the "capture" effect for receiving the desired signal.

It is another object of the present invention to devise a communications link with channel assignments properly allocated within the state of the art to be mutually exclusive, so that signals carrying the same type of modulation, can be selectively received in adjacent channels. It is another object of the present invention to increase the number of mutually exclusive channels, into which signals carrying the same type of modulation can be channelled while each signal is still allotted the same or previous bandwidth allocation. It is still another object of the present invention to suppress undesired signals in channels adjacent to the selected channel in the same communication link, where such undesired signals in such adjacent channels might interfere with reception of the desired signal.

This object is attained, according to the present invention in a reception system which includes a receiver having a plurality of interconnected stages and a demodulator, there appearing at an input of the receiver a desired signal which occupies substantially a predetermined bandwidth, and at least one undesired signal which occupies a bandwidth different from, though partially overlapping the predetermined bandwidth, and wherein the receiver includes receiver terminal means operatively located upstream of the demodulator, and wherein each signal has a characteristic high frequency spectrum, and wherein the spectrum of the desired signal, and at least a fraction of the spectrum characteristic of the undesired signal appears across the receiver terminal means, and at least remnants of the undesired signal still appear at the input of the demodulator, and the demodulator is normally capable of demodulating each signal, but requires at least a prearranged level difference between the signals to demodulate the desired signal at an acceptable signal-to-noise ratio, by providing signal selector means coupled to the receiver terminal means for normally continuously selecting one of the signals appearing across the receiver terminal means, gain-controlled feedback means connected with one input thereof to an output of the signal selector means for negatively feeding back to the receiver terminal means that one of the signals substantially 180° out of phase with the spectrum characteristic of the undesired signal when the one of the signals is the undesired signal, frequency-dependent selection means connected to the receiver terminal means for selecting the undesired signal, so as to substantially isolate it from any other signals, and wherein the undesired signal has at an output of the selection means a measurable output level, and comparator means for comparing the output level of the undesired signal at least with a reference level, and for generating at least one error control signal, and wherein the one error control signal feeds another input of the gain-controlled feedback means, and the reference level is set so as to force the remnants of the undesired signal which still appears at the input of the demodulator to assume, through the error control signal, a level below a level of the desired signal thereat, and differing from the level of the desired signal by at least that level difference, so that demodulation of the undesired signal by the demodulator is prevented.

It will be appreciated that the spectrum characteristic of the undesired signal will not, in the case the undesired signal is a carrier modulated by intelligence-carrying frequencies, be dependent on the frequency of the carrier itself. Thus the spectrum characteristic of the undesired signal may be, for example, a radio frequency spectrum or an intermediate frequency spectrum.

Other objects of the present invention will become apparent in part from the description of the preferred embodiments, and will in part be obvious, the improvements being further pointed out specifically in the claims which follow the description of the preferred embodiments. For example, in addition to overcoming difficulties from present spectrum allocation, it is a further object of the invention to make possible a significant improvement in spectrum utilization, by permitting suitably constructed receivers to reject undesired signals adjacent to a selected and desired signal.

BRIEF DESCRIPTION OF THE DRAWINGS

The invention will be better understood with the aid of the drawings, in which

FIG. 1 is a block schematic diagram illustrating the principles of the present invention;

FIG. 2 is a block schematic diagram illustrating a first version of the present invention using IF to IF feedback, and 2 different IF stages;

FIG. 3 is a block schematic diagram of a second version of the invention, employing IF to RF feedback, and 2 different IF stages;

FIG. 4 is a block schematic diagram of a third version of the invention, employing RF to RF feedback, and 2 different IF stages;

FIG. 5 is a block schematic diagram of a fourth version of the invention, using RF to RF feedback and 2 identical IF stages;

FIG. 5a is a block schematic diagram illustrating the use of a manually tunable oscillator in the diagram of FIG. 5;

FIG. 6 is a block schematic diagram of an alternate version of a circuit employed in the versions shown in FIG. 2 through 5;

DESCRIPTION OF THE PREFERRED EMBODIMENTS

Figure 7:
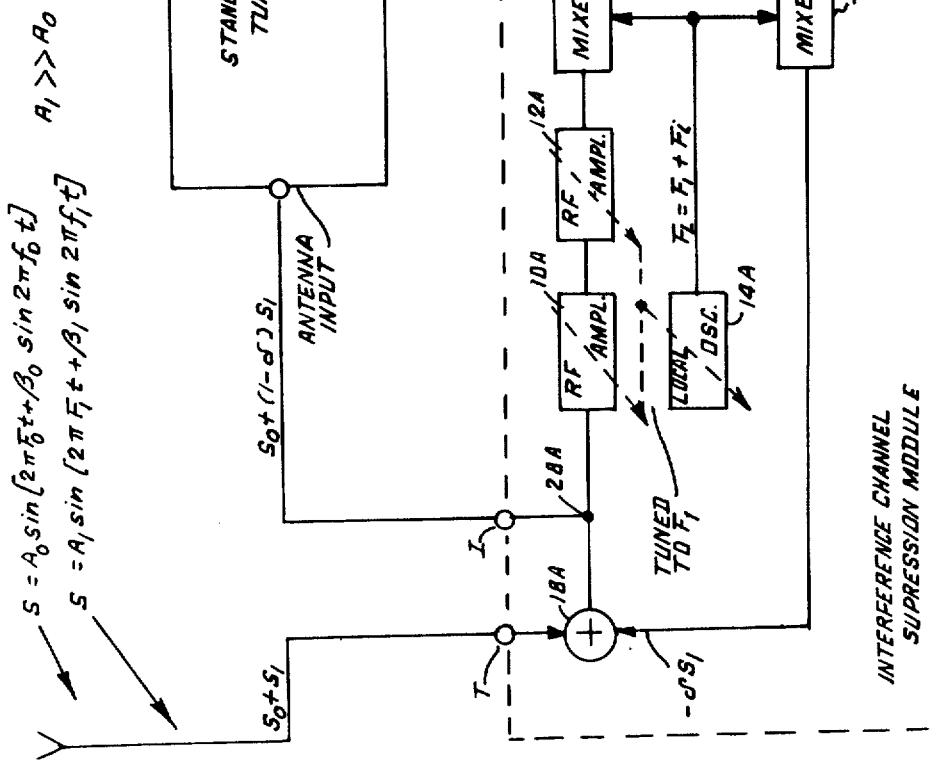
FIG. 7 is a block schematic diagram of the invention using the concept of the invention shown in FIG. 4, but implemented with a commercially available receiver and an adaptor in the form of an interference channel suppression module.

In carrying the invention into effect, and referring now in particular to FIG. 1, at the input terminal 1 of the receiver or signal processor illustrated in FIG. 1, there is present a wanted or desired signal $S_o$, in addition to an interfering, or undesired signal $S_1$. The interfering or undesired signal $S_1$ is detected by selection means S, whose output $mS_1$ is a measure of the undesired signal. The output signal $mS_1$ of the selection means S is fed to a gain-controlled amplifier CA which has a nominal and controllable gain g regulated on a gain-regulating input gr thereof. Phase delay means P are postcoupled to the gain-controlled amplifier CA changing the phase of the ouput of the gain-controlled amplifier CA, so that the signal at the output of the phase delay means P is $-gmS_1 = -\delta S_1$ where $gm = \delta$. The output of the phase delay means P is fed to an adder or error control circuit E, so that the output signal from the error control circuit is $S_o + (1-\delta)S_1$. This latter signal is fed into a signal selection and output circuit W yielding substantially the wanted or desired signal $S_o$ at its output. The output circuit W includes a detector, whose sensitivity threshold is above the signal level $S_o$.

The gain of the gain-controlled amplified CA is controlled in a comparator or difference value circuit D which accepts on one input thereof the level of the output signal $mS_1$ of the selection means S, and on the other input thereof a fixed reference source R, the difference between the levels $mS_1$ and R being fed to the gain-regulating input gr of the gain-controlled amplifier CA. The reference level R is predetermined in a manner which will cause the comparator D to produce an appropriate control voltage for the amplifier CA such that $(1-\delta)S_1$ is below the threshold of the detector W which accounts for the wanted or desired signal $S_o$ only being present at its output.

Although the principles of operation of the invention are applicable to any system, they are primarily intended for reception of modulated signals, and in particular suitable for reception of weak frequency modulated signals, for example, in fringe areas, in the presence of relatively strong signals, which act as interfering or undesired signals.

The principles of frequency modulation are treated comprehensively, for example, in the book "Frequency Modulation" by August Hund, McGraw-Hill Book Company, Inc. Frequency modulation produces in theory an infinite number of sidebands, as dictated by Bessel functions. An interfering and undesired signal from a carrier adjacent in frequency to the desired carrier to which the receiver is tuned may be powerful enough to interfere with the demodulation of the desired signal, or exclude the desired signal altogether by "capturing" the demodulator circuitry, if the portions of the spectrum of the modulated undesired carrier which fall within the passband selected for the desired signal are still of significant magnitude.

For example, U.S. standards for frequency modulation (FM) broadcasting permit signal frequency deviations of $\Delta f = \pm 75$ kcs, and carrier spacings of 200 kcs. Signal, or intelligence-carrying frequencies of $f = 15$ kcs are not uncommon. For a modulation index $\beta = \Delta F/f = 75/15 = 5$, the fourth sideband pair has the largest relative amplitude; however, the seventh sideband is smaller by only a factor of about 6, and the eighth sideband by a factor of about 20. These contributions are still of significance for distortionless reproduction, and thus must ideally be transmitted, but at $f = 15$ kcs, these sidebands occur at spacings of $7 \times 15 = 105$ kcs, and $8 \times 15 = 120$ kcs, respectively, from their carrier, and thus fall within 95 kcs and 80 kcs, respectively, from the adjacent carrier, potentially interfering with its reception.

Geographic dispersion of adjacent carrier frequencies and a judicious allocation of maximum permissible field strengths produced by adjacent carrier transmitters reduce an interference of this type, since the frequency discriminator type detectors of an FM receiver will completely ignore the weaker signal, as long as it is about 6 db below the desired signal.

However, different transmission path characteristics and transmitting powers for the desired and undesired channels often combine, so that the ratio of the desired to the undesired field strengths obtained at the receiver's antenna causes intermittent capture of the desired signal by the undesired, or interfering signal, or without automatic frequency control (AFC) may produce a combination of both signals. This is particularly bothersome in the case of mobile receivers, such as car radio receivers, because field strength ratios vary constantly and cannot readily be corrected by antenna directivity or placement.

Assuming the presence of two adjacent carriers modulated by intelligence-carrying signals of similar characteristics, including modulating frequencies of up to 15 kcs, the seventh (or eighth) sidebands of the interfering or undesired signal will spill into the passband of the desired signal at amplitudes as high as the highest side band of the desired signal, whenever the amplitude of the undesired, or interfering signal is as low as only 6 times above that of the desired signal.

According to the invention, the sidebands of the interfering or undesired carrier may be negatively fed back either at the original radio frequency carrier, or heterodyned or shifted down to an intermediate frequency carrier. Thus each carrier, whether that of a desired or undesired signal, is modulated by a set of intelligence-carrying frequencies resulting in a first spectrum including the radio frequency carrier and its sidebands. If the radio frequency carrier is shifted to an intermediate frequency carrier, the first spectrum is processed, or shifted into a second spectrum including the intermediate frequency carrier and its sidebands. Either spectrum of the undesired signal can be negatively fed back to appropriate points, or terminals, in the receiver so as to cancel either the original radio frequency (RF) spectrum, or the corresponding intermediate frequency (IF) spectrum. In what follows, examples of each method will be described.

It is, of course, also possible to omit the IF stage and to use a "straight" receiver without heterodyning the radio frequency to an intermediate frequency, in which case only RF to RF feedback can be employed.

The following nomenclature will apply in the description which follows:

$S_o$ = desired signal
$F_o$ = desired carrier frequency
$S_1$ = adjacent lower signal
$F_1 = F_o - d$ = adjacent lower carrier frequency
$d$ = carrier to carrier spacing
$S_2$ = adjacent higher signal
$F_2 = F_o + d$ = adjacent higher carrier frequency
$F_i$ = (standard) intermediate frequency = 10.7 Mcs
$F_L$ = local oscillator frequency for desired signal = $F_o \pm F_i$
$F_o \pm \frac{1}{2}d$ = bandwidth required for distortion-free reception
$f$ = modulation or intelligence-carrying frequency
$\alpha$ = phase angle
$g$ = gain of gain-controlled amplifier A = open loop amplitude of undesired signal at first adder output It will further be instructive to understand that whenever a mixer stage receives two frequencies, that it generates both sum and difference frequencies at its output, but as the sum frequencies as a rule fall well beyond the cut-off of any IF stages following the mixer stage, they can thus be ignored. Only the difference frequencies of any interfering adjacent channels, such as $$F_L - F_1 = (F_o + F_i) - (F_o - d) = F_i + d, \text{ and}$$

$$F_L - F_2 = (F_o + F_i) - (F_o + d) = F_i - d$$

must be dealt with.

Referring now to FIG. 2, which implements the present invention by cancelling an undesired signal at an intermediate frequency, there are shown, by way of an example, two radio frequency stages 10 and 12 connected in series, each having a passband of about $F_o \pm \frac{1}{2}d$. A variable local oscillator 14 ganged, for example, to RF stages 10 and 12, feeds a mixer 16, the local oscillator 14 and the mixer 16 constituting heterodyning means shifting the radio frequency spectrum to an intermediate frequency spectrum, an intermediate frequency stage 20 normally allowing only the intermediate frequency spectrum of the desired signal to pass, and filtering out all other unwanted products in a conventional manner. The intermediate frequency stage 20, which is postcoupled through an adder 18 to the mixer 16, feeds a conventional demodulator stage 22. In the case of an amplitude-modulated carrier the demodulator in the demodulator stage 22 is a product detector. In the case the incoming signal is a frequency-modulated carrier, the demodulator stage 22 includes a limiter, a discriminator, and an optional stereo decoder. The demodulated output of the demodulator stage 22 is the audio frequency output, which is fed in a conventional manner to a loudspeaker, or loudspeakers. An automatic gain control line 24 may be connected in a conventional manner from the demodulator stage 22 to the intermediate frequency stage 20, and an automatic frequency control lead 26 may be connected in a conventional manner to the local oscillator 14. The intermediate frequency stage 20 has a nominal bandwidth of $F_i \pm \frac{1}{2}d$, a gain $d_o$ and shifts the intermediate frequency by a phase angle $\alpha_o$.

With the execution of the adder 18, whose function is to generate an output which is the sum of its two inputs, the aforedescribed circuit elements are those of a conventional superhet receiver. The present invention is equally applicable to a "straight" receiver, in which case, for the purpose of a simplified schematic, the local oscillator 14, the mixer 16, and the intermediate stage 20 may be omitted, the output of the RF stage 12 being connected directly to the demodulator stage 22. As the construction of either a superhet receiver, or of a straight receiver is well known, they will not be discussed in further detail.

The input to the selection means of the present invention is obtained from terminal means 28, which, in the example illustrated constitute the output of the adder 18. The signal from the terminal means 28 is fed to a second intermediate stage 30. Any undesired signal, $S_1$, modulated for example, on a lower adjacent carrier, $F_1 = F_o - d$, where $F_o$ is the desired carrier frequency, and d the carrier-to carrier spacing set, will be characterized by its particular spectrum, and at least a portion of the bandwidth allotted to the undesired signal, or its spectrum, particularly in the case of the wider spectra used in frequency modulation, may pass through the preceding RF stages 10 and 12, as well as the mixer 16, resulting in an intermediate frequency signal of open loop amplitude $A_1$. Fed into one input of the adder 18, the undesired signal will be received, together with the desired signal by the intermediate frequency stage 30 which has a passband designed to pass only the intermediate frequency spectrum of the undesired signal with a gain of $a_1$ and a phase shift of $\alpha_1$.

The undesired signal selected by the intermediate frequency stage 30 is amplified by gain setting means, including, for example, a gain-controlled amplifier 32 having a variable gain $g_1$, to which there is postcoupled phase delay means 34 set to have a compensating phase shift $180° - \alpha$. The means for postcoupling the gain-controlled amplifier 32 to the intermediate frequency stage 30 is an electrically conducting lead 31, but other means could be used for this purpose, which will be described later. It will be understood that instead of the configuration shown, the gain-controlled amplifier 32 could also be postcoupled to the phase delay means 34. The output from the phase delay means 34 can be connected either directly to the second input of the adder 18, or can be connected thereto through a second adder 36, obtaining another optional input from another (non-illustrated) loop including circuit elements similar to elements 30, 31, 32 and 34, except that the corresponding intermediate frequency stage will pass a higher adjacent carrier $F_2 = F_o + d$. Thus while the passband of the intermediate frequency stage 30 is nominally $(F_i - d) \pm \frac{1}{2}d$, the passband of the intermediate frequency stage of the other loop will be nominally $(F_i + d) \pm \frac{1}{2}d$. It will also be understood that if the gain-controlled amplifier contributes an additional phase delay $\gamma$ to the circuit, that the compensating phase shift will be $180° - (\alpha + \gamma)$.

In a further development a level detector 38 is connected to the output of the intermediate frequency detector stage 30, and a comparator 40 is postcoupled to the level detector 38. The other input of the comparator 40 is connected to a reference level source 42. It is the function of the level detector 38 to convert the intermediate frequency, for example, to D.C. if the reference level source 42 also has a D.C. output, so that the comparator 40 provides a control voltage to the gain-regulating input 44 of the gain-controlled amplifier 32. If the total loop gain of the feedback loop including elements 30, 31, 32 and 34 is then $\delta_1 = a_1 g_1$, wherein $-\delta_1 A_1$ is the signal amplitude, fed back to the second input of adder 18, then the gain $g_1$ of the gain-controlled amplifier 32 is varied by the output of the comparator 40 until $\delta_1$ is sufficiently close to unity, so that $(1 - \delta_1)$ is sufficiently small by a suitable selection of the adjustable reference level source 42, and $(1 - \delta_1)A_1$, representing the total amplitude of the adjacent lower carrier signal is smaller than the amplitude of the desired signal after passing through the intermediate frequency state 20. It will be understood that the aforedescribed relations apply substantially also when the carrier $F_1$ is modulated by intelligence, or intelligence-carrying frequencies f, be the modulation an amplitude modulation, or a frequency modulation.

The second version of the invention, which is shown in FIG. 3, and where similar elements have been designated with the same reference numerals as corresponding elements of FIG. 2, differs for the version of FIG. 2 in employing IF to RF feedback, instead of IF to IF feedback, shown in FIG. 2. Here the adder means 1B' is operatively located ahead of the heterodyning means, and the output of the phase delay means 34 is fed to a mixer 46, having another input fed by the local oscillator 14. The output of the mixing stage 46 is fed either directly, or through an adder 36' to the adder 18'. The level detector 38, the comparator 40, and the reference level source 42 operate in a manner similar to that described for FIG. 2.

It should be noted that in the version of the invention shown in FIG. 3, that the receiver terminal means 28' are coupled to the feedback signal selection means, for example the intermediate frequency stage 30, through the RF amplifier stage 12, and the mixer 16. The adder 36' serves a function similar to that of the adder 36 of FIG. 2.

The version of the invention shown in FIG. 4 employs RF to RF feedback. It differs from the version shown in FIG. 3 by the receiver terminal means 28" feeding the second intermediate frequency stage 30 through a mixer 48, whose other input is fed by local oscillator means 14'. In the version shown in FIG. 4 the local oscillator means 14" could actually be identical to the local oscillator 14, so that only one local oscillator unit is required. The local oscillator means 14" are shown separate, however, in FIG. 4 from the local oscillator 14, since this is a generic way to implement an RF to RF feedback version, as will be seen when discussing the version shown in FIG. 5. The output from the phase delay means 34 is fed through an additional mixer 50, whose other input is also fed by the local oscillator means 14'. The output of the mixer 50 could be fed back to an alternate adder 18''' instead of to the adder means 18" through an appropriate position of the switch 52. The switch 52 is shown here primarily for an understanding of these alternate ways of implementing RF to RF feedback; in practice for reasons of economy only one or the other ways is likely to be implemented. Use of the receiver terminal means 28''' requires no modification of the conventional receiver, however, if the local oscillator means 14", separate from the local oscillator 14, is used, as it is located at the antenna terminals of the receiver.

When it is desired to use receiver terminal means 28'''' at the input of the receiver, it is advantageous to also place the adder 18" next thereto, so that the combination of the adder 18" and the receiver terminal means 28''' forms a single unit.

The versions of the invention shown in FIGS. 2, 3, and 4 all employ two different IF stages.

Where it is desirable to use identical IF stages, an RF to RF feedback system can be used, which employs separate local oscillator means 14''', the frequency of which must be adjusted to heterodyne the undesired signal to fall within the passband of the aforementioned identical IF stage. If supression of the upper (or lower) adjacent channel is desired, the frequency of oscillator means 14''' must be set to be the carrier spacing d above (or below) the frequency of oscillator means 14. The separate local oscillator means 14''' are advantageously in the form of a voltage-controlled oscillator 54, shown in the version of the invention illustrated in FIG. 5.

The voltage controlled oscillator 54 requires auxiliary circuitry in the form of an automatic frequency setting circuit.

The auxiliary circuitry for the voltage controlled oscillator includes a staircase voltage generator, such as described, for example in John Markus, Source book of electrical circuits, McGraw Hill 1968, chapter 81, page 685 ff., and denoted with the reference numeral 62. A waveform Wf of the output of the staircase, or stairstep generator 62 is illustrative of a typical operation thereof. Upon being enabled, the staircase generator 62 typically operates in a search mode, and provides to the voltage controlled oscillator a D.C. voltage selectable in steps. If the voltage controlled oscillator increases in frequency when a rising voltage is applied to its input, then an "up" staircase generator will be needed to search a band, for example, above a desired signal, while in such an eventuality, a "down" staircase generator is used when searching a frequency band, for example, below a desired signal.

Gate 64 can typically be used as enabling means, enabling the staircase generator in one state thereof, and disabling the staircase generator 54 in another state thereof. When the staircase generator 54 is disabled, it operates so as to "stay" at whatever "flat" portion of the staircase voltage it happens to attain at the moment it is disabled.

A clock 66 generates stepping signals for the staircase generator 62; its output is fed through the enabling means 64, acting as a gate, to the staircase voltage generator 64.

It will be understood that it is only desired to stop the staircase voltage generator 62 for an undesired signal, such as an adjacent carrier $F_1$ or $F_2$, for example modulated by intelligence-frequencies. For this purpose there is provided a mixer 68, receiving on one of its inputs an output from the voltage controlled oscillator 54, and on its other input the output of the local oscillator 14. The output of the mixer 68 is fed in turn to a tank circuit, or resonant means 70 tuned to the frequency d of the carrier-to-carrier spacing. The output of the tank circuit 70 is fed to a shaping circuit 72, which provides an inhibiting pulse to the enabling means 64 when the output frequency of the mixer 68 includes the frequency d, usually set at 200 kcs. Start-up means, for example in the form of a push-button 74, are conveniently provided to provide manually, for example, a reset pulse to the staircase generator 62, and a start pulse to the enabling means 64. Thus the voltage controlled oscillator which feeds its output to the mixer 48, is automatically set, for example, to a frequency $F_{L\pm d}$, depending on whether the staircase generator 62 is an "up" or "down" staircase generator.

Advantageously two complementary staircase generators 62 are provided for each receiver, one being an "up" staircase generator the other being a "down" staircase generator, to provide for rejection of both adjacent upper and lower carriers, together with the required associated circuitry.

The advantage of this scheme is that upon feeding the output of the voltage controlled oscillator 54 to the mixer 48, the intermediate stage 30 can now be implemented as a "standard" IF stage, having an intermediate frequency usually set at 10.7 Mcs.

In FIGS. 2 through 5 where the term "LO." inscribed in a circle has been used it is intended to denote the local oscillator 14. This notation has been used for clarity's sake to avoid a multiplicity of lines connecting the local oscillator 14 to the corresponding mixer. Also, for the sake of brevity, the term "phaser" has been used in the drawings to denote phase delay means.

It will be appreciated that the auxiliary frequency setting circuitry connected to the voltage controlled oscillator 54 can be dispensed with, if a manually controlled local oscillator 56 shown in FIG. 5A is employed in lieu of the voltage controlled oscillator 54. In that event circuit elements 62 through 74 will not be needed.

The electrically conducting lead 31 shown in FIGS. 2 through 5 can be replaced by the circuit elements shown in FIG. 6; a switch S serves to switch over the operation of the circuit from the lead 31 to the phase-locked loop shown in FIG. 6 by switching the circuit from terminals A-B to terminals A'-B'. This will be applicable where each signal is a carrier frequency-modulated with intelligence-carrying frequencies. The phase-locked loop which postcouples the intermediate frequency stage 30 to the gain setting means has the advantage that the full capture capability of F.M. reception is enlisted to capture the spectrum of the interfering signal which has passed through the intermediate frequency stage 30 to the exclusion of the spectrum of the desired signal for feedback and selective reduction of the interfering signal at the receiver terminal means. The ratio of the desired signal over the interfering signal at the input of the demodulator stage 22 is therefore further operatively increased by the capture effect occurring in the reception of frequency-modulated signals, so as to substantially approach infinity. Unless, of course, for example, the interfering signal saturates the input circuitry of the receiver itself.

The phase-locked loop shown in FIG. 6 conventionally consists of a limiter 76 postcoupled to the intermediate frequency stage 30, a phase comparator 78 postcoupled with one input thereof to the limiter 76, an amplifier 80 postcoupled to the phase comparator 78, a low-pass filter 82 postcoupled to the amplifier 80, and a voltage-controlled oscillator 83 postcoupled to the low-pass filter 82. The output of the voltage-controlled oscillator 83 is connected to another input of the phase comparator 78, and to the signal input of the variable gain, or gain-controlled amplifier 32.

FIG. 7 is a block diagram of a version of the present invention implemented as an adaptor kit or interference suppression module used in conjunction with a standard frequency-modulated receiver.

A standard receiver tuned to the desired carrier frequency $F_o$-for example a stereo receiver with two loudspeakers-has a signal input terminal I (referred to in FIG. 7 as the antenna input), and an antenna terminal T. The lead normally connecting the terminals I and T is removed, and the adaptor kit or interference channel suppression module is connected across the terminals T and I.

The terminal I is connected to the terminal $28_A$ of the adaptor kit, which is in turn connected to the input of a radio frequency stage $10_A$. Another radio frequency stage $12_A$ is post-coupled to the radio frequency stage $10_A$, and a local oscillator $14_A$ is ganged to the tuning circuits of radio frequency stages $10_A$ and $12_A$. A mixer $16_A$ is postcoupled to the radio frequency stage 12A and constitutes with the local oscillator $14_A$ heterodyning means. An intermediate frequency stage $30_A$ is postcoupled to the mixer $16_A$ and has a predetermined passband. The heterodyning means may be tuned to a selected undesired signal so as to substantially pass the undesired selected signal through the passband of the intermediate frequency stage $30_A$.

The output from the intermediate frequency stage $30_A$ is fed through either the lead 31, or through a phase-locked loop illustrated in FIG. 6 to the variable gain, or gain-controlled amplifier $32_A$, and therefrom through phase delay means $34_A$ (denoted for brevity as "phaser" in FIG. 7) to a mixer 50, which latter is connected with another input thereof to the output of the local oscillator $14_A$.

An adder $18_A$ is adapted to be connected with one input thereof to the antenna terminal T, and is connected with another input thereof to the output of the mixer $50_A$. The output of the adder $18_A$ is connected to the signal input of the radio frequency stage $10_A$, and is also adapted to be connected to the terminal I, namely the signal input terminal of the standard receiver.

It will be appreciated that the adaptor kit or interference suppression module will have to be manually tuned to the selected undesired signal for it to fulfill its interference-suppression function.

The level detector $38_A$, the comparator $40_A$, and the reference level source $42_A$ operate in a manner similar to the corresponding stages already described for the reception system of the present invention.

The occurrance of the desired signal $S_o$ and of the undesired signal $S_1$ is also shown in FIG. 7 in terms of their respective amplitudes and the standard notation adopted for frequency-modulated signals. For clarity, the notation is shown for only one modulating frequency, $f_o$ and $f_1$ respectively, for each of the signals. $F_o$ and $F_1$ are the carrier frequencies, $A_o$ and $A_1$ the amplitudes, and $B_o$ and $B_1$ the modulation indices of the desired and the undesired signals, respectively.

Figure 8:
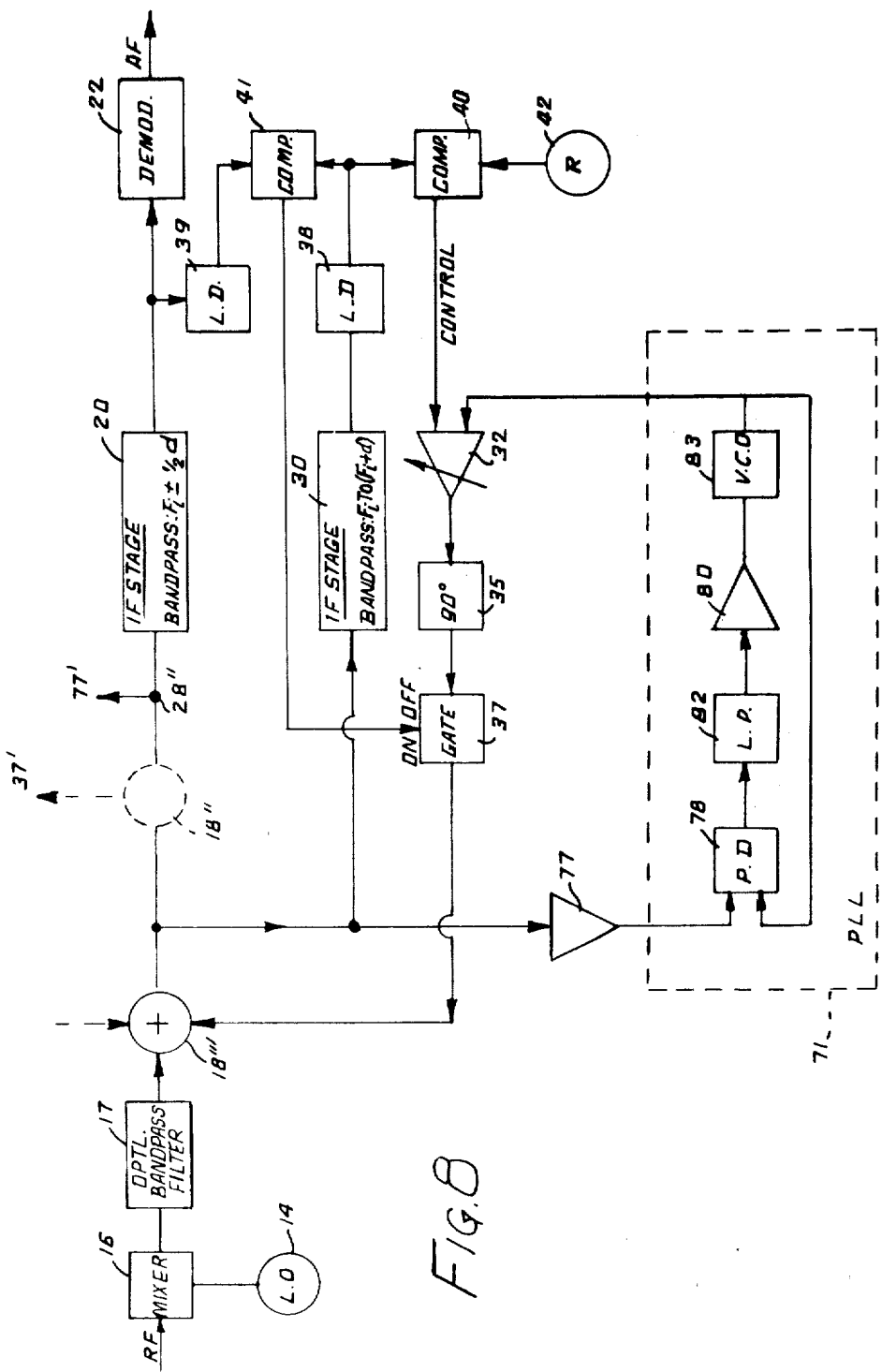
FIG. 8 is a block schematic diagram of an alternate version of the circuit shown in FIG. 2.

One example of a further version of the invention, employing IF to IF feedback, is shown in FIG. 8. This version differs from the versions shown in FIGS. 2, 3, 4, 5 and 7 in deriving the feedback signal for the undesired signal from receiver terminals located ahead of the IF stage 30 instead of from the output of the IF stage 30.

Referring to FIG. 8, the RF portions of the receiver have been omitted for the sake of simplicity and similar elements have been designated with the same reference numbers as corresponding elements of FIG. 2.

Downstream of the mixer $16^{IV}$ there is connected a bandpass filter 17 designed to pass the desired signal, but to reject any strong undesired signals relatively remote from the desired signal, and having at least some sidebands either in the vicinity of the desired signal, or possibly partially overlapping the bandwidth allotted to the desired signal. The bandpass filter 17 will typically have a bandpass characteristic with relatively shallow edges to preserve phase linearity, which is important when passing, for example, frequency-modulated systems through the receiver. This feature is important when a strong undesired signal of a nearby radio transmitter, though relatively remote in frequency from the desired signal, has outlying sidebands at a sufficient amplitude to either reach the vicinity of the desired signal, or possibly even partially overlap the bandwidth of the desired signal.

An adder $18^{iv}$ is postcoupled to a mixer $16^{IV}$, its output fedding the IF stage 20, selecting the desired signal, the output of which is the input to the demodulator 22. The terminal $28^{iv}$ is connected to the output of the adder $18^{iv}$. The feedback to the undesired signal, adjacent to the desired signal on one side of the spectrum, is derived from signal selector means, such as a conventional phased-locked loop 71, including a phase detector 78, a low pass filter 82, an amplifier 80 and a VCO 83, and is postcoupled through a buffer stage, which is preferably a limiter 77 to the terminal $28^{iv}$. The output of the limiter 77 is connected to one input of a phase detector 78, its other input being the output of the voltage-controlled oscillator 83 which also supplies the feedback of the undesired signal to the gain-controlled amplifier 32, the gain of which is controlled, as in the other versions, by the control voltage output of comparator 40 one input of which is the level of the undesired signal, selected by the IF stage 30, which is postcoupled to the terminal $28^{iv}$. That level is detected by a level detector 38, and compared with a predetermined reference level 42. The output of the gain-controlled amplifier 32 is phase delayed 90° by a phase delay circuit 35 and must pass through inhibiting means, such as a gate 37 before being fed to the second input of the adder 18$^{iv}$.

The predetermined reference level 42, as in the other versions, is a "safe" level to which the undesired signal will be reduced by the negatively added feedback, as measured after the IF stage 30 selecting and amplifying it. Thus the reference level 42 can be chosen large for secure operation of the feedback loop, yet still assure that remnants of the undesired signal, after passing through the IF stage 20, designed to select the desired signal, is below the threshold of the demodulator 22.

Both the desired and the undesired signals may be present across the terminal 28$^{iv}$ and phase-locked loop 71 will "lock-on" the stronger one. Thus unwanted feedback would occur if the desired signal is the stronger one, or the only one present. To avoid such unwanted feedback, the levels of both desired and undesired signals are compared after they have been selected by their respective IF stages 20 and 30. A level detector 39 is postcoupled to the IF stage 20 which selects the desired signal, and a comparator 41 produces an output corresponding to the difference between the outputs of the level detectors 38 and 39. This output controls inhibiting means, such as the gate 37, in such a manner as to turn off the feedback signal to the adder 18$^{iv}$ whenever the desired signal is stronger than the undesired signal by an amount which would make it possible that the phase-locked loop 71 is "captured" by the desired signal.

It will be further understood that I do not wish to be limited to the embodiments set forth, as it will be apparent that numerous variations and modifications can be made in the subject of the present invention by anyone skilled in the art, in accordance with the principles of the invention hereinabove set forth, and without the exercise of any inventive ingenuity. It will be appreciated, for example, that where the position of one element in a loop is interchangeable with the position of one or more other elements without substantially affecting the function of the loop, no new circuit is created. Furthermore it will be understood that where any versions of the invention claimed and described for the reception system apply to the adaptor kit, that such versions can be used therein without departing from the spirit and scope of the invention.

It will be further understood that any feature claimed in one claim can be suitably combined with another feature in another claim; for example, the IF/RF system claimed in claim 10 and shown in FIG. 3, or the RF/RF system claimed in claim 9 and shown in FIG. 5, can be used instead of the IF/IF system claimed in claims 1,2,3 or 4, or in claim 20 or the non-discriminatory frequency-dependent selection means, as far as amplitude of the selected signal is concerned, can be used in the reception system claimed in claim 1, as well as in the reception system claimed in claim 20. Also any feature claimed in one reception system can be substituted for a feature claimed in a different reception system.

I claim:

1. In a reception system including a receiver having a plurality of interconnected stages including a front stage and a demodulator, said demodulator having a predetermined amplitude threshold sensitivity, there appearing at an input of said receiver a desired signal occupying substantially a predetermined bandwidth, and at least one undesired signal occupying a bandwidth different from, though partially overlapping said predetermined bandwidth, said receiver including receiver terminal means operatively located upstream of said desired signal, and at least a fraction of the spectrum characteristic of said undesired signal appearing across said receiver terminal means, at least remnants of said undesired signal still appearing at the input of said demodulator, said demodulator being normally capable of demodulating each of said signals, but requiring at least a prearranged level difference between said signals at its input to demodulate said desired signal at an acceptable signal-to-noise ratio, the improvement comprising, in combination therewith signal selector means coupled to said receiver terminal means for normally continuously selecting one of said signals appearing across said receiver terminal means, gain-controlled feedback means with one input connected to an output of said signal selector means for negatively feeding back to said receiver terminal means said one of said signals substantially 180° out of phase with said spectrum characteristic of the undesired signal when said one of said signals is said undesired signal, said signal selector means including frequency-dependent selection means for selecting said undesired signal, so as to substantially isolate it from any other signals, said undesired signal having at an output of said frequency-dependent selection means a measureable output level, and comparator means for comparing said output level of said undesired signal at said frequency-dependent selection means at least with a reference level, and for generating at least one error control signal, said one error control signal feeding another input of said gain-controlled feedback means, said reference level being settable over a wide and non-critical range so as to force said remnants of said undesired signal still appearing at the input of said demodulator to assume, through said error control signal, a controlled level below a level of said desired signal thereat, and differing from said level of said desired signal by at least said level difference, selection of said desired signal by said signal selector means being substantially not affected by the relative amplitude of the desired signal with respect to said undesired signal, from a received desired signal level sufficient to reach said predetermined threshold sensitivity up to when at least said front stage is overloaded due to a signal of excessive signal strength being received by said receiver, whereby, despite the presence of any controlled level of said remnants of said undesired signal upstream of said demodulator, demodulation of said undesired signal by said demodulator is prevented.

2. The reception system as claimed in claim 1, further comprising inhibiting means connected to said feedback means for inhibiting operation of said feedback means, said signal selector means being operable to select the stronger of said signals, and wherein said comparator means include comparison means having an output, and being connected with one input thereof to an output of one of said stages, and with another input thereof to the output of said frequency-dependent selection means, the output of said comparison means being connected to said inhibiting means, and providing another error control signal adjusted to inhibit operation of said feedback means when said desired signal is the stronger of said signals, whereby feedback of the desired signal is prevented.

3. The reception system as claimed in claim 2, wherein said signal selector means include a phase-locked loop, being captured and locking onto said stronger signal by virtue of the inherent characteristics thereof.

4. The reception system as claimed in claim 3, further comprising a limiter connected between said receiver terminal means and said phase-locked loop.

5. The reception system as claimed in claim 1, wherein said feedback means includes phase delay means for phase-delaying said one of said signals.

6. The reception system as claimed in claim 1, wherein the high frequency spectrum of each signal at the input of said receiver is a radio frequency spectrum, and wherein at least one of said stages comprises first down-converting heterodyning means shifting the radio frequency spectrum received at its input to an intermediate frequency spectrum, said undesired signal thereby having a radio frequency spectrum and an intermediate frequency spectrum, said selection means selecting said feedback signal so as to include at least said fraction of one of said characteristic spectra.

7. The reception system as claimed in claim 6, wherein said receiver is arranged to receive at its input additional undesired signals, and wherein at least some of said additional undesired signals may be in the vicinity of said predetermined bandwidth, and further comprising a bandpass filter connected downstream of said first down-converting heterodyning means for passing said desired signal, yet rejecting said some of said undesired signals.

8. The reception system as claimed in claim 6, wherein said receiver terminal means are located downstream of said first down-converting heterodyning means, said undesired signal being thereby fed back to said receiver terminal means at said intermediate frequency spectrum.

9. The reception system as claimed in claim 6, wherein said receiver terminal means are located upstream of said first down-converting heterodyning means, said undesired signal being thereby fed back to said receiver terminal means at said radio frequency spectrum.

10. The reception system as claimed in claim 6, wherein said receiver terminal means include radio frequency receiver terminals and intermediate frequency receiver terminals, said frequency-dependent selection means being connected to said intermediate frequency terminals, and further comprising up-converting heterodyning means connected with an input thereof to an output of said gain-controlled feedback means, and connected with an output thereof to said radio frequency receiver terminals, said undesired signal being thereby fed back to said radio frequency terminals at said radio frequency spectrum.

11. The reception system as claimed in claim 6, wherein said desired signal is a first radio frequency signal, and wherein said first down-converting heterodyning means converts said first radio frequency signal to a first intermediate frequency signal, and wherein said stages include a first intermediate frequency stage having a predetermined transfer characteristic for passing said first intermediate frequency signal therethrough, the being postcoupled to said first down-converting heterodyning means, and wherein said undesired signal is a second radio frequency signal, and further comprising second down-converting heterodyning means connected to said receiver terminal means for converting said second radio frequency signal to a second intermediate frequency signal, and wherein said frequency-dependent selection means include a second intermediate frequency stage of a prearranged transfer characteristic postcoupled to said second down-converting heterodyning means.

12. The reception system as claimed in claim 11, wherein said first radio signal has a first carrier frequency, and said second radio signal has a second carrier frequency separated by a certain frequency difference from said first carrier frequency, and wherein said first intermediate stage has a first passband defining a first center frequency, and said second intermediate stage has a second passband defining a second center frequency, said center frequencies being separated from one another by said certain difference frequency, and wherein said first and second down-converting heterodyning means include a common local oscillator.

13. The reception system as claimed in claim 11, wherein said first radio signal has a first carrier frequency, and said second radio signal has a second carrier frequency separated by a certain difference frequency from said first carrier frequency, and wherein said first down-converting heterodyning means include a first local oscillator, and said second down-converting heterodyning means include a second local oscillator, said oscillators being settable so that said predetermined transfer characteristic can be selected to be substantially equal to said prearranged transfer characteristic.

14. The reception system as claimed in claim 13, wherein at least one of said oscillators is a variable oscillator.

15. The reception system as claimed in claim 14, wherein said one of said oscillators is a mechanically variable oscillator.

16. The reception system as claimed in claim 14, wherein said one of said oscillators is an electronically variable oscillator.

17. The reception system as claimed in claim 14, wherein the other of said oscillators is a variable oscillator and further comprising automatic frequency setting means for maintaining said difference frequency between said oscillators.

18. The reception system as claimed in claim 17, wherein said electronically variable oscillator is a voltage controlled oscillator, and wherein said automatic frequency setting means includes a staircase voltage generator operable in a search mode upon being enabled, and providing to said voltage controlled oscillator a D.C. voltage selectable in discrete steps, enabling means for enabling and disabling the search mode of said staircase voltage generator, said staircase voltage generator remaining at the voltage step occurring at the output thereof at the time of receiving a disabling input from said enabling means, a mixer receiving on one input thereof the output of said voltage controlled oscillator, and on another input thereof the output of said other oscillator, resonant circuit means connected to the output of said mixer, and tuned to said difference frequency between the said carrier frequencies, and a shaping circuit connected to the output of said resonant circuit means and to the input of said enabling means, for providing an inhibiting pulse to said enabling means upon the output frequency of said mixer including said difference frequency, said enabling means being arranged to provide said disabling input to said staircase voltage generator upon receiving said inhibiting pulse from said shaping circuit, and arranged to provide an enabling pulse to said staircase generator upon receiving a start pulse, said voltage-controlled oscillator thereby following the frequency of said other oscillator electronically.

19. The reception system as claimed in claim 18, further comprising start-up means for providing said start pulse to said enabling means, and a clock providing stepping pulses to said staircase generator.

20. In a reception system including a receiver having a plurality of interconnected stages including a front stage and a demodulator, said demodulator having a predetermined amplitude threshold sensitivity, there appearing at an input of said receiver a desired signal occupying substantially a predetermined bandwidth, and at least one undesired signal occupying a bandwidth different from, though partially overlapping said predetermined bandwidth, said receiver including receiver terminal means operatively located upstream of said demodulator, each signal having a characteristic high frequency spectrum, the spectrum of said desired signal, and at least a fraction of the spectrum characteristic of said undesired signal appearing across said receiver terminal means, at least remnants of said undesired signal still appearing at the input of said demodulator, said demodulator being normally capable of demodulating each of said signals, but requiring at least a prearranged level difference between said signals at its input to demodulate said desired signal at an acceptable signal-to-noise ratio, the improvement comprising, in combination therewith, signal selector means coupled to said receiver terminal means for normally continuously selecting the stronger of said signals appearing across said receiver terminal means, gain-controlled feedback means with one input connected to an output of said signal selector means for negatively feeding back to said receiver terminal means said undesired signal substantially 180° out of phase with said spectrum characteristic of the undesired signal when said undesired signal is the stronger of said signals, said signal selector including frequency-dependent selection means for selecting said undesired signal, so as to substantially isolate it from any other signals, said undesired signal having at an output of said frequency-dependent selection means a measurable output level, comparator means for comparing said output level of said undesired signal at said frequency dependent selection means at least with a reference level, and for generating at least one error control signal, said one error control signal feeding another input of said gain-controlled feedback means, said reference level being settable over a wide and non-critical range so as to force said remnants of said undesired signal still appearing at the input of said demodulator to assume, through said error control signal, a controlled level below a level of said desired signal thereat, and differing from said level of said desired signal by at least said level difference, selection of said desired signal by said signal selector means being substantially not affected by the relative amplitude of the desired signal with respect to said undesired signal, from a received desired signal level sufficient to reach said predetermined threshold sensitivity up to when at least said front stage is overloaded due to a signal of excessive signal strength being received by said receiver, whereby, despite the presence of any controlled level of said remnants of said undesired signal upstream of said demodulator, demodulation of said undesired signal by said demodulator is prevented, and inhibiting means connected to said feedback means for inhibiting operation of said feedback means, said comparator means including comparison means having an output, and being connected with one input thereof to an output of one of said stages, and with another input thereof to the output of said frequency-dependent selection means, the output of said comparison means being connected to said inhibiting means, and providing another error control signal adjusted to inhibit operation of said feedback means when said desired signal is the stronger of said signals, whereby feedback of the desired signal is prevented.

* * * * *